(12) United States Patent
Gray

(10) Patent No.: US 7,222,217 B2
(45) Date of Patent: May 22, 2007

(54) CACHE RESIDENCY TEST INSTRUCTION

(75) Inventor: Jan Gray, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 347 days.

(21) Appl. No.: 10/609,105

(22) Filed: Jun. 27, 2003

(65) Prior Publication Data

US 2004/0268045 A1    Dec. 30, 2004

(51) Int. Cl.
*G06F 12/00* (2006.01)
*G06F 13/00* (2006.01)

(52) U.S. Cl. .................. 711/118; 711/119; 711/154

(58) Field of Classification Search .............. 711/100, 711/117, 118, 123, 125, 136, 154
See application file for complete search history.

(56) References Cited

U.S. PATENT DOCUMENTS

| | | | | | |
|---|---|---|---|---|---|
| 5,594,864 | A | * | 1/1997 | Trauben | 714/39 |
| 5,696,932 | A | * | 12/1997 | Smith | 711/118 |
| 5,828,860 | A | * | 10/1998 | Miyaoku et al. | 712/207 |
| 6,052,775 | A | * | 4/2000 | Panwar et al. | 712/215 |
| 6,382,846 | B1 | * | 5/2002 | Lai et al. | 712/209 |
| 6,453,278 | B1 | * | 9/2002 | Favor et al. | 703/27 |
| 6,560,676 | B1 | * | 5/2003 | Nishimoto et al. | 711/128 |
| 6,681,295 | B1 | * | 1/2004 | Root et al. | 711/128 |

\* cited by examiner

*Primary Examiner*—Tuan V. Thai
(74) *Attorney, Agent, or Firm*—Lee & Hayes, PLLC

(57) ABSTRACT

A cache residency test instruction is described which, when executed by a processor unit, allows the processor unit to determine if a set of data resides in a cache memory that is communicatively coupled to the processor unit and communicate a result of the determination to software being executed on the processor unit.

28 Claims, 10 Drawing Sheets

CACHE RESIDENCY TEST INSTRUCTION

TECHNICAL FIELD

The present invention generally relates to cache memories, and more particularly to techniques for a processor unit to determine residency of data in a cache memory and indicate that determination to software.

BACKGROUND

Functionality of computing devices, such as desktop PCs and portable computers, continues to increase at a rapid pace. Improvements in functional aspects such as processor unit speed and amount of data that may be stored by a memory have increased the functionality that may be offered to users of these computing devices. However, advances in one functional aspect may not correspond to advances achieved by other aspects, and may therefore limit the overall functionality of the computing device which is available to a user. For example, even though a processor unit has made great advances in the speed at which data processing may be performed, advances made in memories, such as random access memory (RAM) chips, have not had a corresponding increase in speed. Therefore, a memory operating at a slower speed than a processor unit may serve to limit actual functionality available from the processor unit. For instance, the processor unit may be forced to wait to read data for processing and/or write data that has been processed.

One way to increase the functionality of the processor unit is through the use of a cache memory. A cache memory may be configured as a semiconductor-based memory which is used to store data for use by the processor unit. By using a cache memory, a processor unit may perform tasks more rapidly by having quicker access to data, such as data for processing and instructions to be performed by the processor chip. For instance, a cache memory may be included on a processor chip which includes the processor unit. The cache memory may be accessed at a speed that more closely corresponds to the speed of the processor unit, and therefore may be accessed much more quickly than other types of memory, such as RAM. Therefore, the processor unit may encounter fewer delays when accessing the cache memory than when accessing data using other types of memory. Thus, a greater portion of the speed provided by the processor unit may be realized. Traditional uses of a cache memory, however, did not permit the processor unit to directly indicate to software executed on the processor unit whether data was stored in the cache memory.

Accordingly, there is a need for improved techniques for utilization of a cache memory.

SUMMARY

A cache memory residency test instruction is described, which when executed by a processor unit, allows the processor unit to determine if a set of data resides in a cache memory and communicate a result of the determination to software being executed on the processor unit. The processor unit performs data processing of a processor chip, such as by performing instructions and the like. The cache memory stores data for use by the processor unit. The data may include instructions to be executed by the processor unit and data to be processed by the processor unit.

The residency instruction is issued by the processor unit in order to determine if a set of data resides in the cache memory. For example, the residency instruction may be used to query the cache memory to determine if the set of data is stored in the cache memory. As a result of the query, the processor unit may receive an indication as to whether the set of data is stored in the cache memory, which is then communicated to software being executed on the processor. By determining whether the set of data is stored in the cache memory, the software being executed on the processor unit may recognize characteristics that are likely to be encountered when accessing the set of data, such as a relative amount of time it will take to access the set of data, and the like.

BRIEF DESCRIPTION OF THE DRAWINGS

The same numbers are used throughout the disclosure and figures to reference like components and features.

DETAILED DESCRIPTION

Overview

Figure 1:
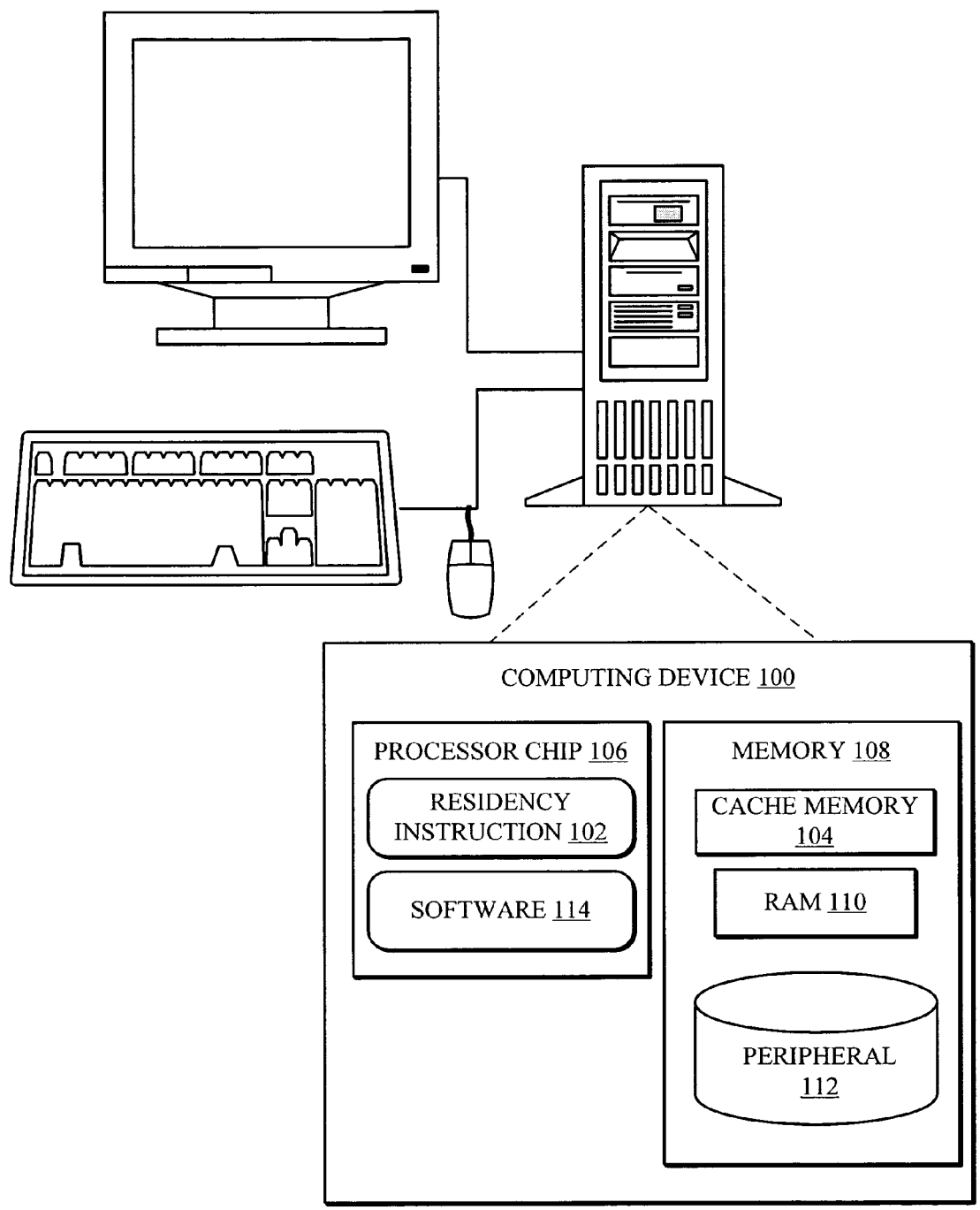
FIG. 1 is an illustration of an exemplary implementation wherein a computing device includes a residency instruction.

A cache residency test instruction is described, which when executed by a processor unit, allows the processor unit to determine if a set of data at a specific memory address resides in a cache memory. The processor unit may then communicate a result of the determination to software being executed on the processor unit. The processor unit is communicatively coupled to a cache memory. The processor unit performs data processing of a processor chip, such as by performing instructions and the like. The cache memory stores data for use by the processor unit. The data may include instructions to be executed by the processor unit and data to be processed by the processor unit. The cache memory may be located on the processor chip with the processor unit and/or may be located off the processor chip, such as on a processor card or motherboard.

In many usage scenarios, the amount of data used by the processor within a certain time interval greatly exceeds the size of the cache memory. In such cases, the cache will only contain a small subset of the required data. Accesses to data that are not present in cache read or write data in slow external RAM, which can be many times slower. Traditional cache and instruction set designs do not provide a simple, fast facility for software to determine in one instruction if a given memory access to some memory address is likely to be a "hit", that quickly finds the referenced data in the fast on-chip cache memory, or will be a "miss", an access to slow external RAM because the requested data is not already resident in the cache memory. By providing a cache residency test instruction, software that accesses and manages large data sets (larger than on-chip cache) could use the facility to more efficiently order its memory accesses so as to visit memory addresses in an order that reduces the total number of such time consuming cache "misses".

The cache residency test instruction is issued by the processor unit in order to determine if a set of data resides in the cache memory. For example, execution of the cache residency test instruction may be used to query the cache memory to determine if the set of data resides, e.g. is stored, in the cache memory. As a result of the query, the processor unit may receive an indication which indicates whether the set of data is stored in the cache memory. The processor unit may then provide this indication to software being executed on the processor unit, such as an application, operating system, and so forth. In one implementation, the cache residency test instruction leverages existing comparator hardware in the cache to determine if data is resident in the cache, and then provides the determination to software being executed on the processor. The cache residency test instruction may be utilized to determine whether data is included in the cache without moving the data and therefore without encountering complications that arise from a cache "miss," such as reading data from other memories and the like.

Cache Residency Test Instruction

FIG. 1 is an illustration of an exemplary implementation in which a computing device 100 includes a cache residency test instruction 102 (residency instruction) the execution of which may be used to determine whether a set of data is stored in a cache memory 104. The computing device 100 includes a processor chip 106 to perform data processing and a memory 108 for storing data. The computing device 100 may be configured in a variety of ways, such as a computer 1102 as described in relation to FIG. 11.

The memory 108 serves to store data for use by the processor chip 106. Data may include data to be processed by the processor chip 106 and instructions to be performed by the processor chip 106. The memory 108 may utilize a wide variety of data storage options. For example, the memory 108 may include a random access memory (RAM) 110. The memory 108 may also include peripheral memory 112, which may include hard disk drives, computer readable mediums, and the like.

Each of the data storage options of the memory 108 may have different access times and provide different amounts of storage to supply desired functionality to the computing device 100. For example, peripheral memory 112 may be used to store large quantities of data, such as entire programs, operating systems, data, and so on, for use by the processor chip 106. Peripheral memory 112 may be persistent. For instance, data which is stored in the peripheral memory 112 may be accessed when the peripheral memory 112 returns to operational status from an interruption encountered during operation of the peripheral memory 112. Interruptions may include a power interruption, "turning-off" the computing device 100, and the like. However, the speed at which data is read to or written from the peripheral memory 112 may be orders of magnitude slower than the speed of the processor chip 106. For example, in one implementation, the speed of the processor chip 106 may be such that the processor chip 106 may be able to execute ten million instructions in an amount of time it takes to access a set of data which is stored in the peripheral memory 112. Therefore, operation of the computing device 100 may be slowed significantly when the processor chip 106 reads a set of data from or writes a set of data to the peripheral memory 112.

To provide for faster access times, random access memory (RAM) 110 may be used. RAM 110 may be used by programs executing on the processor chip 106 to perform tasks while the computing device 100 is powered-on. RAM 110 may be configured as an integrated circuit memory chip(s) that allows data to be accessed in any order and all storage locations are equally accessible. The processor chip 106 may load data from the peripheral memory 112 to the RAM 110 that is to be used by the processor chip 106. In this way, the processor chip 106 may access data, e.g. reads a set of data or writes a set of data, from the RAM 110 at greater speeds than the peripheral memory 112.

Even though RAM 110 may be accessed at speeds significantly faster than the peripheral memory 112, RAM 110 may operate at speeds which are still slower than the speed of the processor chip 106. For instance, in one implementation, the processor chip 106 may be able to execute three hundred instructions in an amount of time it takes to access data from the RAM 110. Each time the processor chip 106 has to wait to perform a next instruction while accessing data from the RAM 110, the processor chip 106 loses three hundred opportunities to perform instructions. These lost opportunities may limit the overall functionality available from the processor chip 106. As a result, even if processor chip 106 speeds continue to increase, access to data stored in RAM 110 may limit the amount of that speed which is available to a computing device 100 utilizing the processor chip 106.

The memory 108 includes the cache memory 104 to further reduce an amount of time used to access data by the processor chip 106. The cache memory 104 may operate at or near the speed of the processor chip 106 so that wait times of the processor 106, when accessing data, are reduced. Increasing speed in accessing data from the cache memory 104 may be achieved in a variety of ways. For example, the increase in speed may be achieved by configuring the cache memory 104 to have a smaller memory, e.g. less memory locations than that found in the RAM 110, so that data may be quickly found. The increase in speed may also be provided by locating the cache memory 104 close to the processor chip 106, and even on the processor chip 106 itself, so that data has a short distance to travel both to and from the cache memory 104. The processor chip 106 may perform more instructions by reducing the number of times, and the amount of time, the processor chip 106 waits to access data.

The cache memory 104 may be used to take advantage of a concept called "locality of reference." The underlying theory behind the locality of reference concept is that, even when a large program is executed on the computing device 100, generally just a small portion of the program is executed at any one point in time. By providing for storage of that portion of the program in the cache memory 104, the processor chip 106 may operate at a speed that is much closer to its full speed by reducing the amount of time the processor chip 106 waits to read and/or write data. Data from other portions of the memory 108, such as RAM 110 and peripheral memory 112, may be loaded into the cache memory 104 to take advantage of the increased speed provided by the cache memory 104.

An execution of the residency instruction 102 is used to improve the interaction of the processor chip 106 with the cache memory 104, and more particularly, to improve performance of software 114 being executed on the processor chip 106. The residency instruction 102, when executed on the processor chip 106, is used to determine if a set of data resides in the cache memory 104. Through execution of the residency instruction 102, the processor chip 106 may recognize characteristics likely to be encountered when accessing the set of data. For example, characteristics of data access may include whether the set of data resides in the cache memory 104, and therefore may be accessed with minimal delay, or whether the set of data resides in other portions of the memory 108, such as RAM 110, peripheral memory 112, and the like. Therefore, the processor chip 106 may establish a relative amount of time it will take to access the set of data, without actually accessing the set of data, e.g. reading or writing the set of data. The processor chip 106 may communicate a result of the determination to software 114 being executed on the processor chip 106 such that the software 114 may use the result to plan the next actions to be performed when executing the software 114. For instance, the software 114 may determine which operation to perform first based on whether a set of data that will be the subject of the operation is available from the cache memory 104.

Figure 2:
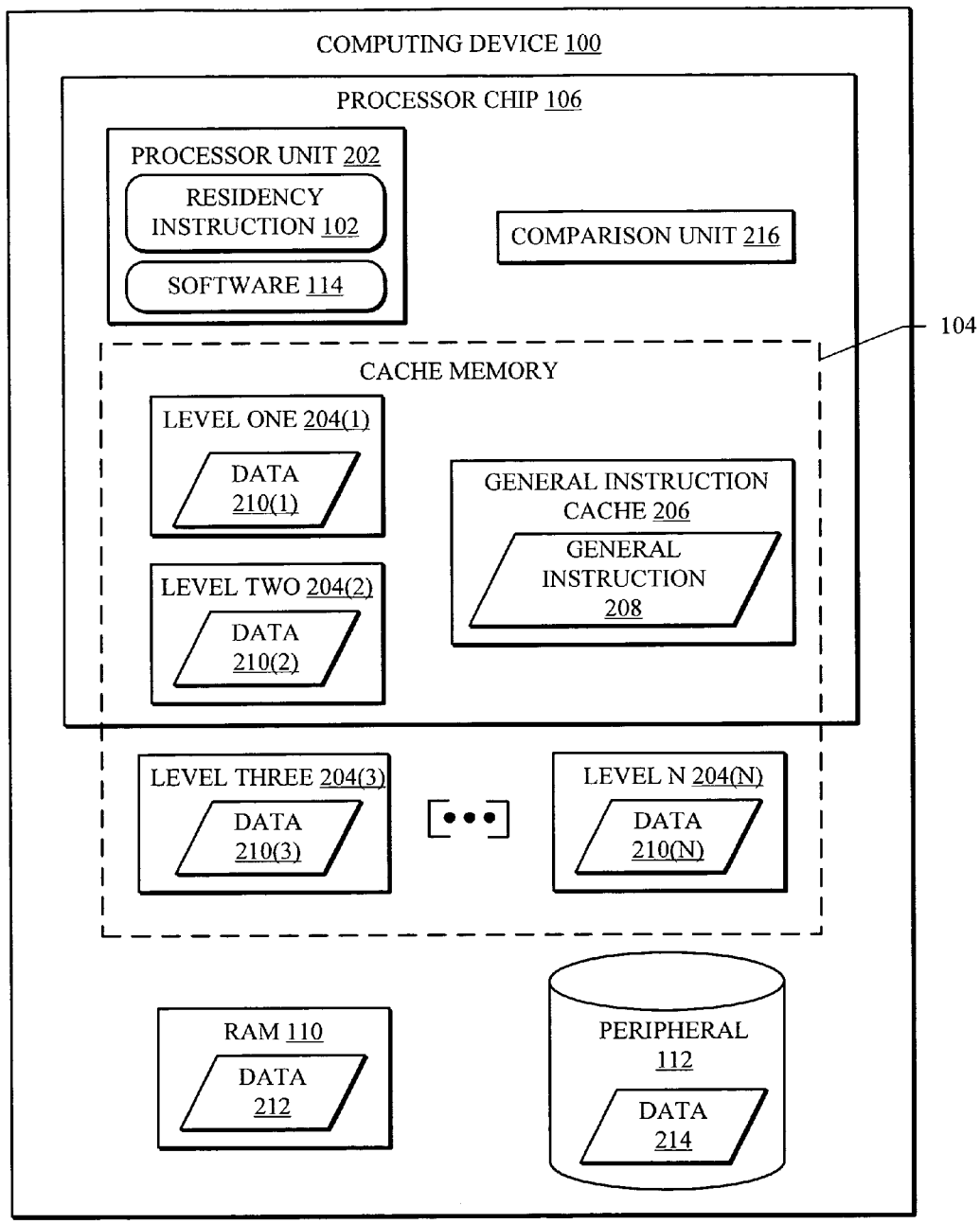
FIG. 2 is an illustration of an exemplary implementation in which a processor chip, which includes a processor unit and a cache memory, is shown.

FIG. 2 shows the processor chip 106 and the cache memory 104 in more detail. The processor chip 106 includes a processor unit 202 that performs the data processing of the processor chip 106. Data processing may include performing instructions that execute arithmetic operations, load and store data, and the like.

The cache memory 104 may be configured in a variety of ways to provide data access for the processor unit 202. The cache memory 104 may store data, such as instructions for controlling operation of the processor unit 202 and data for processing by the processor unit 202. In the illustrated example, the cache memory 104 includes a level one cache memory 204(1) and a level two cache memory 204(2) which are located on the processor chip 106. A level three cache memory 204(3) through a level N cache memory 204(N) are illustrated as being located off the processor chip 106. For example, the level three cache memory 204(3) may be included on a processor card or motherboard. A separate general instruction cache memory 206 is illustrated to demonstrate storing of general instructions 208 by the cache memory 104 for use by the processor unit 202. For purposes of simplifying the following discussion, data shall refer to both data for processing and instructions, and references to a "cache memory" shall refer to a cache memory which may store instructions and/or data for processing by the processor unit 202.

Each of the levels 204 of the cache memory 104 may be configured to provide different functionality when used in conjunction with the processor unit 202. For example, the level one cache memory 204(1) may provide access to data 210(1) stored in the level one cache memory 204 at a rate which is equal to or close to the processor unit's 202 speed, e.g. an amount of time taken to execute an instruction by the processor unit 202. The level two cache memory 204(2) may be configured to store a greater amount of data 210(2) than the amount of data 218 stored in the level one cache memory 204(1). The level two cache memory 204(2), however, may provide access to data 210(2) at a slower rate than the level one cache memory 204(1). For example, by providing for increased data storage, increased overhead may be encountered when accessing data 210(2) stored in the level two cache memory 204(2), such as due to additional memory spaces being used, by employing a slower, longer length of signal traces to provide a connection to the additional memory spaces, and the like. Likewise, the level three cache memory 204(3) through the level N cache memory 204(N) may store increasingly greater amounts of data 210(3), 210(N), respectively, but provide slower access to the data 210(3), 210(N).

The levels 204 of the cache memory 104 may be provided in a variety of ways. Although, the level one cache memory 204(1) and the level two cache memory 204(2) are shown as included on the processor chip 106, and the level three cache memory 204(3) is shown as being located off the processor chip 106, the levels 204 may be located differently in various implementations. For example, each level of the cache memory 104 may be located on the processor chip 106, each level of the cache memory 104 may be located off the processor chip 106, and various combinations of the forgoing.

The RAM 110 provides storage for a greater amount of data 212 than the cache memory 104, but provides slower access. The peripheral memory 112 may provide storage for an even greater amount of data 214 than the RAM 110, and may provide persistent data storage as described previously. However, the peripheral memory 112 may include mechanical components which further increase an amount of time used to access the data 214, as opposed to access provided by semiconductor-based memories, such as the RAM 110. Therefore, when progressing through the levels 204(1)-204(N) of the cache memory 104, RAM 110, and peripheral memory 112, a sliding scale may be observed in which increasingly greater amounts of storage are provided which are accessed at slower speeds.

The residency instruction 102, when executed on the processor unit 202, is used to determine whether a set of data resides in the cache memory 104. For example, the residency instruction 102 may be issued by the processor unit 202 in order to indicate whether the set of data resides in the cache memory 104 or outside the cache memory 104, such as in RAM 110, a peripheral device 112, and so on. By determining whether a set of data resides (or does not reside) in the cache memory 104, the processor unit 202 may recognize characteristics of how access to the set of data will be provided, and communicate those characteristics to software 114 being executed on the processor unit 202. For example, the processor unit 202, by determining that a set of data resides in the cache memory 104 may establish that the set of data may be accessed quicker than if the set of data resided outside the cache memory 104, such as in RAM 110. Similar determinations of data residency may be used to establish relative access times of data contained at each of the levels 204-210 of the cache memory 104, as will be described in greater detail in relation to FIG. 5.

When executed, the residency instruction 102 may configure a comparison unit 216 to ascertain whether a particular address of a set of data requested by the processor unit 202 is included in the cache memory 104. For example, the comparison unit 216 may compare an address of a set of data received by the processor unit 202 with addresses of data stored in the cache memory 104 to determine if the set of data resides in the cache memory 104. A further discussion of operation of the comparison unit may be found in the following implementation.

Figure 3:
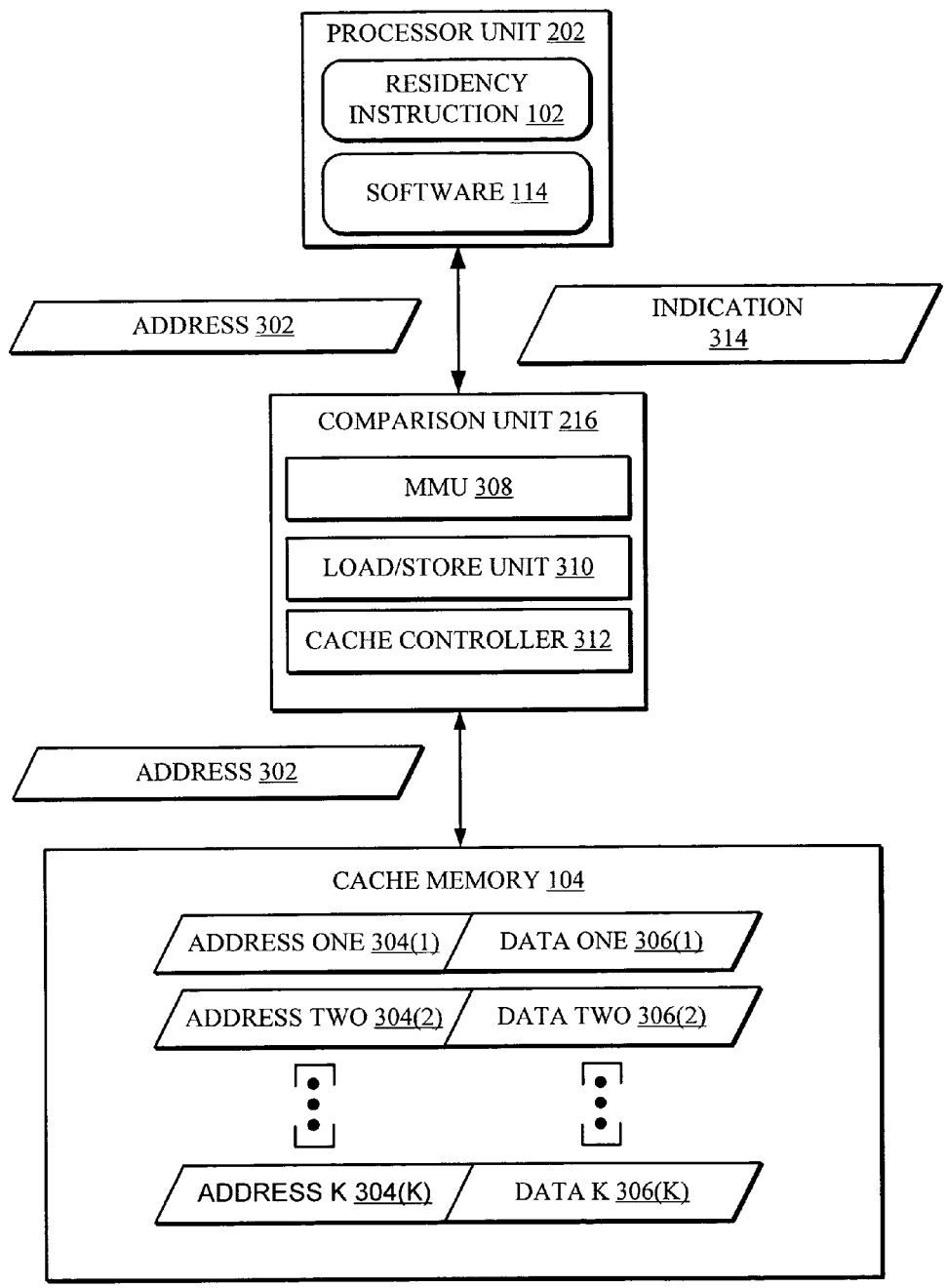
FIG. 3 is an illustration of an exemplary implementation in which execution of the residency instruction is shown.

FIG. 3 is an illustration of an exemplary implementation in which execution of a residency instruction 102 is described. To determine whether a set of data resides in the cache memory 104, the processor unit 202 issues the residency instruction 102 for the set of data so that the residency instruction 102 is executed, such as with the processor unit and/or with another processor unit. One result of the execution of the residency instruction 102 is that an address 302 is provided for the set of data to the comparison unit 216 to query whether the cache memory 104 includes the set of data.

When the comparison unit 216 receives the address 302 for the set of data from the query, the comparison unit 216 compares the address 302 to one or more addresses 304(1)-304(K) of sets of data 306(1)-306(K) included in the cache memory 104. Based on the comparison, the comparison unit 216 may discover whether the set of data is included in the cache memory 104. Thus, the comparison unit 216 may indicate to the processor unit 202 whether the set of data is one of the sets of data 306(1)-306(K) stored in the cache memory 104 based on the comparison.

The comparison unit 216 may be implemented in a variety of ways. For example, the comparison unit 216 may be provided by a memory management unit (MMU) 308 included on the processor chip 106 (FIG. 2). The MMU 308 manages the memory 108 for the processor unit 202, including translating addresses, searching the cache memory 108, migrating data, and the like. The comparison unit 216 may also be provided by a load/store unit 310 included on the processor chip 106. The load/store unit 310 provides data to the processor unit 202 and stores data output by the processor unit 202. The comparison unit 216 may also be implemented by a cache controller 310. The cache controller 312 controls operation of the cache memory 104. For example, the cache controller 312 may control writing data from other portions of memory 108 (FIG. 1) to the cache memory 104, writing data from the cache memory 104 to other portions of the memory 108, which sets of data are stored in the cache memory 104, and the like.

An indication 314 is provided by the comparison unit 216 to the processor unit 202 to indicate whether the address 302 is included in the cache memory 104, and therefore, whether the set of data resides in the cache memory 104. The indication 314 may be communicated to software 114 that is being executed on the processor unit 202. The indication 314 may assume a variety of configurations. For example, the indication 314 may be configured as a binary indicator which indicates whether the set of data resides or does not reside in the cache memory 104. The indication 314 may also indicate at which level of the cache memory 104, of a plurality of levels, the set of data resides. A further discussion of use of an indication and levels of the cache memory 104 may be found in relation to FIG. 5.

In an implementation, determining whether a set of data resides in the cache memory 104 may be performed without reading the set of data from the cache memory 104 or writing the set of data to the cache memory 104. Thus, the processor unit 202 may make a determination as to whether a set of data resides in the cache memory 104 without actually transferring the set of data. In this way, the processor unit 202 may establish a relative amount of time that will be used to access the set of data, e.g. read and/or write data, before the set of data is actually read and/or written. The processor unit 202 may then communicate this indicated relative amount of time to software 114 being executed on the processor unit 202. Therefore, as stated previously, the software 114 may take into account from which memory location the data is available, e.g. the cache memory 104 or elsewhere, and plan accordingly.

Figure 4:
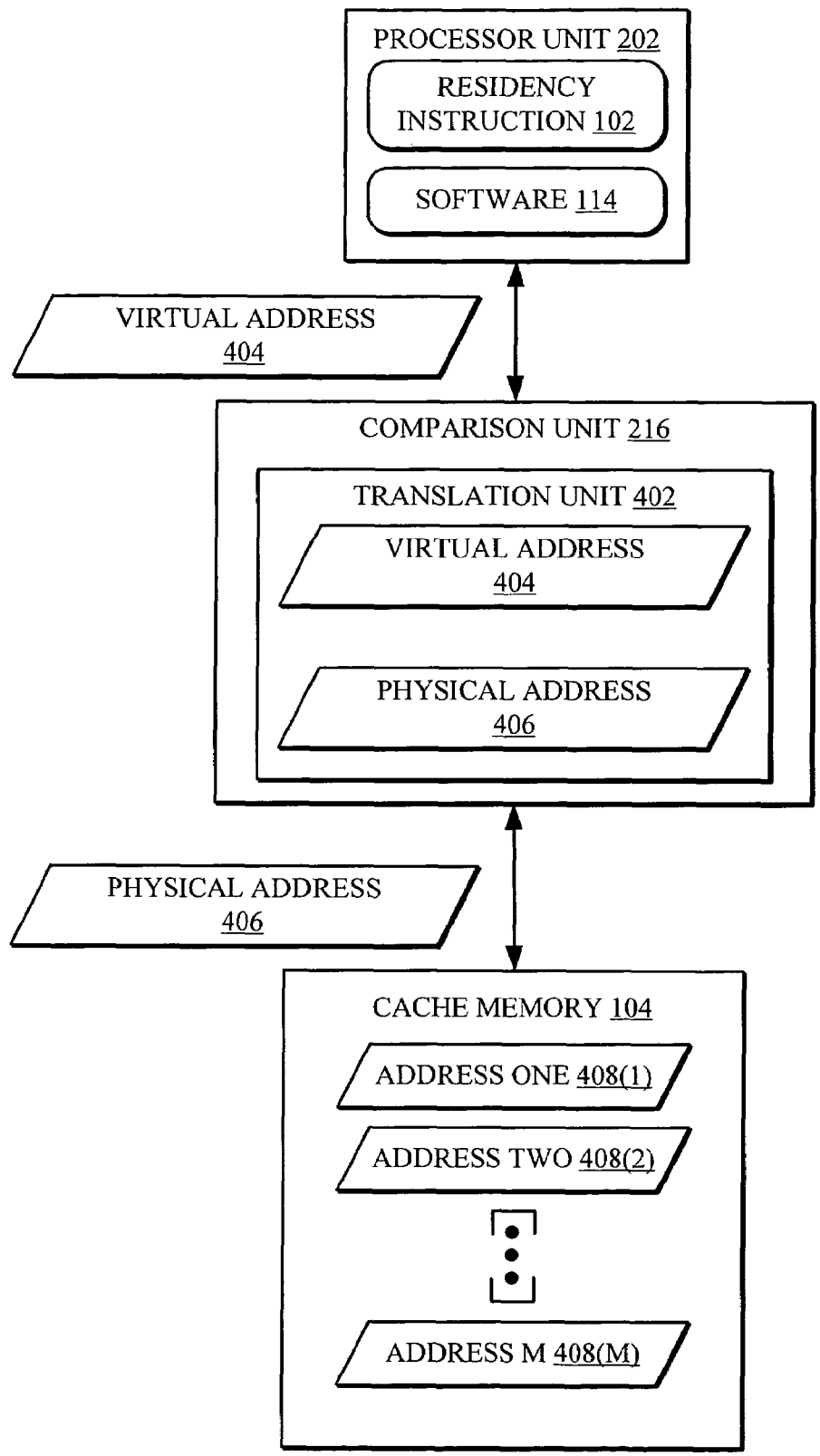
FIG. 4 is an illustration of an exemplary implementation in which operation of a comparison unit to translate an address is shown.

FIG. 4 is a further illustration of operation of the comparison unit 216. Addresses of data may be configured in a variety of ways. For example, addresses, which are used by the processor unit 202 to locate and differentiate data, may be configured differently from addresses used by the memory 108 as seen in FIG. 1. In one implementation, the processor unit 202 may use a virtual address to identify a set of data which does not directly correspond to a physical address of a set of data in the memory 108. For instance, the virtual address of the processor unit 202 may not be suitable for being used directly by the memory 108. To provide an association between the virtual and physical addresses, a translation unit 402 may be employed by the comparison unit 216 that associates virtual addresses with physical addresses in the memory 108.

The processor unit 202, for example, may issue a residency instruction 102 to determine whether a set of data resides in the cache memory 104, as previously described. The processor unit 202, however, provides a virtual address 404 of the set of data to query whether the set of data resides in the cache memory 104. The comparison unit 216 receives the virtual address 404 and translates the virtual address 404 to a physical address 406 using the translation unit 402. The comparison unit 216 compares the physical address 406 to addresses 408(1)-408(M) in the cache memory 104. The comparison unit 216 then indicates, to the processor unit 202, whether the set of data resides in the cache memory 104. The indication may then be provided to software 114 being executed on the processor unit 202. Although a virtual to physical translation has been described, in another implementation, the cache memory 104 may be configured so that data stored in the cache memory 104 is addressed directly using virtual addresses. Therefore, in such an instance, translation of the address is not utilized.

The cache memory 104 may utilize a variety of mapping techniques to provide access to data stored in the cache memory. For example, the cache memory 104 may utilize a direct mapping technique in which a particular set of data is stored in a particular location of the cache memory 104. Therefore, only one address comparison is utilized to determine if the set of data resides in the cache memory 104. The cache memory 104 may also be configured to use fully associative mapping, in which a set of data may be stored anywhere in the cache memory 104. When using this mapping technique, addresses 408 in the cache memory 104 are checked until either the address is found, or each address is checked and no matches are found. Further, the cache memory 104 may be configured to use a set-associative technique, in which an address may be stored in a set of locations of the cache memory 104. The set associative technique may be thought of as a compromise between the fully associative technique and the direct mapping technique.

Addresses 408 of the cache memory 104 may be configured to use cache tags to provide additional functionality to the cache memory 104. Cache tags may be utilized as a shortened version of a full address of a set of data to determine a location for the set of data in the cache memory. For example, the last four bits of an address may be used to determine where to store a set of data in the cache memory 104. Therefore, when reading data from or writing data to the cache memory 104, the cache tag may be utilized to more quickly locate the set of data so that the full address of the set of data does not need to be compared with the full address of each set of data located in the cache memory 104. Additionally, a cache tag may store additional information pertaining to a corresponding set of data, such as by indicating whether the set of data is valid (present), dirty (has been written to without yet being written back to RAM) type of the set of data (such as instructions, data for processing, and the like), source of the set of data, and so on.

Figure 5:
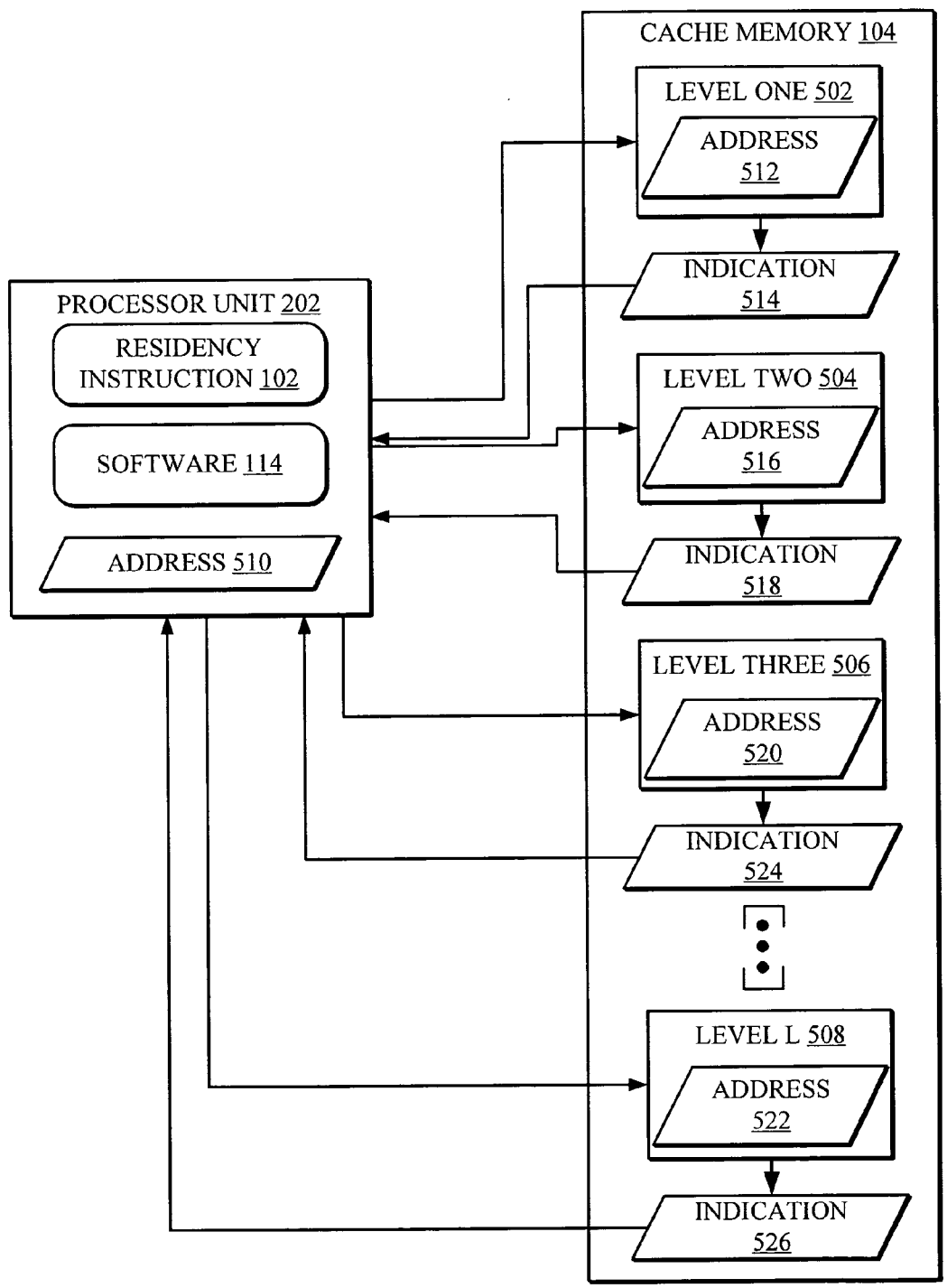
FIG. 5 is an illustration of an exemplary implementation in which an execution of a residency instruction is used in order to indicate at which level of the cache memory a set of data resides.

FIG. 5 is an illustration in which an execution of a residency instruction 102 is used in order to indicate at which level of the cache memory 104 a set of data resides. As previously discussed in relation to FIG. 2, the cache memory 104 may include a plurality of levels 502-508 which provide increasingly greater amounts of storage but provide increasingly longer access times as the levels 502-508 increase. To address the different levels 502-508 and particularly the different characteristics encountered when accessing data from each of the levels 502-508, an execution of the residency instruction 102 may indicate to the processor unit 202 at which of levels 502-508 the set of data resides. Therefore, the processor unit 202 may recognize additional characteristics of accessing a particular set of data depending on which of the levels 502-508 of the cache memory 104 the set of data resides, such as by establishing a relative amount of time it will take to access the set of data. These additional characteristics may then be communicated to software 114 being executed on the processor unit 202 as described previously.

The residency instruction 102, when executed by the processor unit 202, queries a level one cache memory 502 for an address 510 of a set of data. A comparison is made to determine if the address corresponds to an address 512 stored in the level one cache memory 502. An indication 514 is then provided to the processor unit 202 which indicates whether the set of data is available from the level one cache memory 502. Likewise, if the address 510 is not included in the level one cache memory 502, a level two cache memory 504 is queried to determine if the address 510 corresponds to the address 516 stored in the level two cache memory 504. An indication 518 is provided which indicates whether the address is included, and therefore, whether the set of data resides in the level two cache memory 504. Similar querying is performed for a level three cache memory 506 through the level L cache memory 508 for addresses 520, 522 included in the respective level three through level L cache memories 506, 508. Indications 524, 526 are provided which indicate to the processor unit 202 whether the set of data resides in the cache memories, and if so, at which level of the cache memory 104 the set of data resides.

Although separate indications for each level 502-508 of the cache memory 104 have been described, indications may be provided in a variety of ways. For example, a single indication may be provided when the address is located in the cache memory 104 which indicates at which level of the cache memory 104 the address was located. An indication may also be provided which indicates that each level of the cache memory 104 was queried, and the address was not found. In another implementation, indications may be grouped depending on location of the levels of the cache memory 104. For example, referring again to FIG. 2, a single indication may be used to indicate if the address is located in levels of the cache memory 104 which are included on the processor chip 106, such as the level one and level two cache memories 204, 206. Likewise, a separate indication may be provided to indicate if the address is included in levels of the cache 104 which are located off the processor chip 106, such as the level three through level N cache memories 208, 210. Additionally, although sequential querying of cache level was described, cache levels may be queried concurrently and in one or more groupings. For example, cache levels 2-4 may be queried concurrently, cache level one queried which is then followed by a concurrent query of cache levels 2-4, cache levels 1 and 2 may be queried concurrently, and the like.

Figure 6:
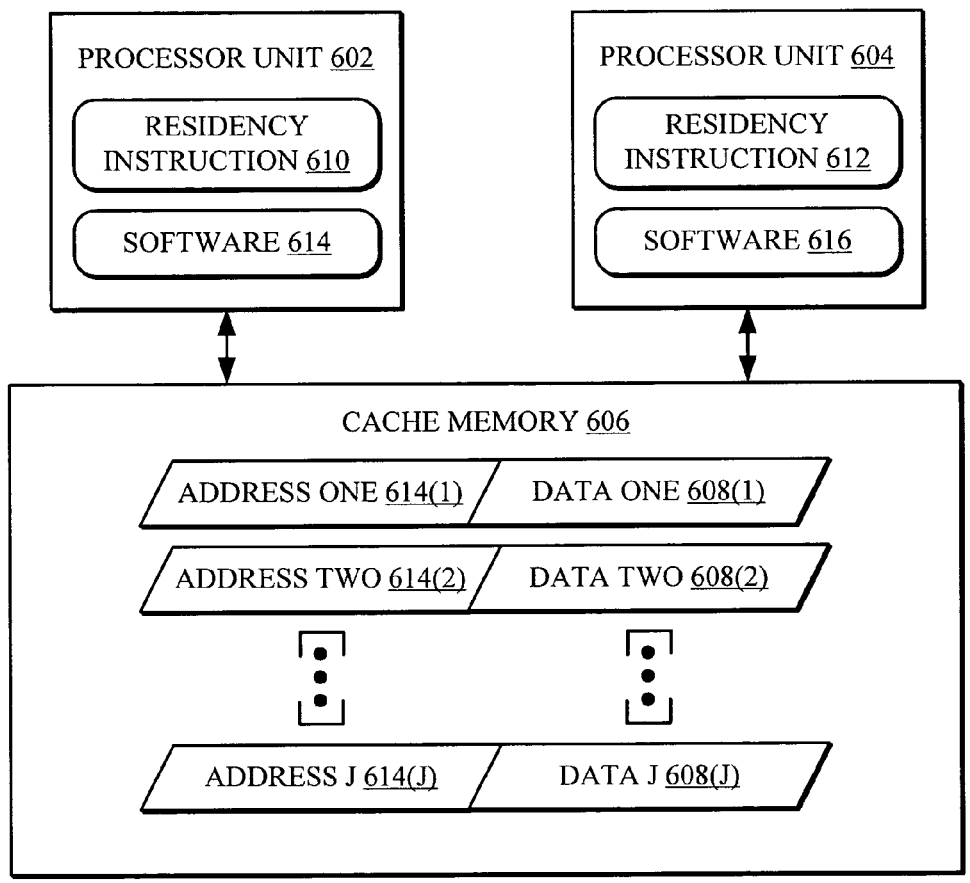
FIG. 6 is an illustration of an exemplary implementation in which an execution of a residency instruction is used in a system employing a plurality of processor units which share a cache memory.

FIG. 6 is an illustration in which an execution of a residency instruction is used in a system 600 employing a plurality of processor units 602, 604 which share a cache memory 606. The plurality of processor units 602, 604 may be utilized to increase processing power of a computing device, such as the computing device 100 illustrated in FIG. 1. The plurality of processor units 602, 604 may be provided on a single processor chip and/or separate processor chips. To decrease the amount of time used to access data, the plurality of processor units 602, 604 is communicatively coupled to the cache memory 606. Each of the processor units 602, 604 may write data to the cache memory 606. Therefore, whether a set of data is stored in the cache memory 606 may be based on use of the set of data by both of the processor units 602, 604. For example, a cache controller (not shown) may control which sets of data 608(1)-608(J) are included in the cache memory 606 based on how recently each of the sets of data 608(1)-608(J) were accessed by either the first and/or second processor units 602, 604.

To determine whether a set of data resides in the cache memory 606, first and second processor units 602, 604 include first and second residency instructions 610, 612, respectively. By executing the residency instructions 610, 612, the first and second processor units 602, 604, respectively, may determine whether a set of data resides in the cache memory 606 regardless of whether the first and/or second processor units 604, 606 have previously interacted with the set of data. Execution of the residency instructions 610, 612 may be used to provide an indication to software 614, 616 being executed on the first and second processor units 602, 604, respectively, as to whether data resides in the cache memory 606. For example, the first processor unit 602 may frequently interact with a first set of data 608(1) having a first address 614(1) during data processing. If the second processor unit 606 desires to interact with the first set of data 608(1), the second processor unit 606 may execute the second residency instruction 612 in order to determine if the first set of data 608(1) resides in the cache memory 606. An execution of the second residency instruction 612 may be used to query the cache memory 606 using the first address 614(1) of the first set of data 608(1) as previously described to find the first address 614(1) from a plurality of addresses 614(1)-614(J) included in the cache memory 606. Likewise, the first processor unit 604 may issue and execute the first residency instruction 610 to determine if a set of data resides in the cache memory 606. By executing first and second residency instructions 610, 612, both the first and second processor units 602, 604, respectively, may determine data residency in the cache memory 606.

Exemplary Cache Residency Test Instructions

The processor unit may implement a variety of cache residency test instruction forms. Each such instruction may express an effective memory address, which may simply be the contents of a general purpose register, a parameter indicating the desired form of result, and an explicit or implicit location where to save the result of the instruction. The following listing contains examples of cache residency test instructions, and is not exhaustive.

An instruction is_in_dcache r1,(r2) might store a 0 if r1 if the set of data addressed by the value of general purpose register r2 are likely not in any level of data cache memory, or a 1 if that set of data are likely in some level of data cache memory.

An instruction set cc_if_in_dcache (r2) might store a 0 to a machine condition code flag register if the set of data addressed by the value of general purpose register r2 are likely not in any level of data cache memory, or a 1 if that set of data are likely in some level of data cache memory.

An instruction is_in_icache r1,(r2) might store a 0 in r1 if the instruction or instructions addressed by the value of general purpose register r2 are likely not in any level of instruction cache memory, or a 1 if the instruction or instructions are likely in some level of instruction cache memory.

An instruction is_in_dcache_on_chip r1,(r2) might make a similar determination if the data addressed by r2 are in some level of on-chip data cache memory.

An instruction is_in_dcache_levels 0b00110,r1,(r2) might make a similar determination if the data addressed by r2 are in cache levels 2 and 3 (as denoted by the bit vector $00110_2$).

An instruction is_in_dcache_on_chip_else_prefetch r1, (r2) might make a similar determination if the data addressed by r2 are in some level of on-chip data cache memory, writing the result to r1, and if the data were not present in on-chip data cache memory, could signal the cache controller and memory subsystem to concurrently (autonomously) begin loading the addressed set of data.

An instruction est_cycles_to_load r1,(r2) might write the estimated number of cycles required to load the set of data addressed by r2, into r1. This instruction would determine which (if any) level of data cache the data addressed by r2 is resident in, and then produce a result taking into account the processor's estimate of how many cycles would be required to load the data from that level of data cache memory.

An instruction est_ps_to_load r1,(r2) might write the estimated number of picoseconds required to load the set of data addressed by r2, into r1. This instruction would determine which (if any) level of data cache the data addressed by r2 is resident in, and then produce a result taking into account the processor's estimate of how much time (picoseconds) would be required to load the data from that level of data cache memory.

An instruction get_cache_entry_attributes_if resident r1, (r2) might determine which (if any) cache memory contains the data set addressed by r1, and then copy that cache entry's attributes (dirty, executable, shared with other caches ("MOESI" bits)), and so forth, into destination general purpose register r1, otherwise write a 0 to r1.

An instruction load_if_data_within_n_cycles r1, r3, r4, (r2) might store a 0 in r1 if the set of data addressed by r2 are likely to take more than r3 cycles to load, otherwise might store a 1 in r1 and also load the addressed data into r4.

EXEMPLARY PROCEDURES

Figure 7:
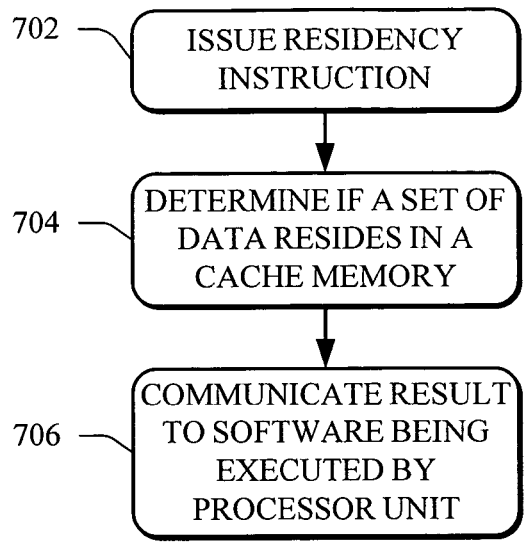
FIG. 7 is a flow diagram depicting an exemplary procedure in which data residency in a cache memory is determined and a result of which is communicated to software.

FIG. 7 is a flow diagram illustrating an exemplary procedure 700 in which a determination is made as to whether a set of data resides in a cache memory. At block 702, a residency instruction is issued. The residency instruction may be issued by a processor unit 202 so that the processor unit 202 may determine whether a set of data is stored in a cache memory 104 communicatively coupled to the processor unit 202.

At block 704, a determination is made by the processor unit as to whether the set of data resides in the cache memory 104 from the issued residency instruction. The processor unit 202, based on the determination, recognizes characteristics of accessing the set of data. For example, the characteristics may include an amount of time that it will take for the set of data to be suitable for being accessed by the processor unit 202. For instance, by "knowing" that the set of data resides in the cache memory 104, the processor unit 202 may establish that a relative amount of time that will be utilized to access the set of data when stored in the cache memory 104 will be less than an amount of time to access the set of data if it was stored outside the cache memory 104, such as in RAM 110.

At block 706, the processor unit 202 communicates a result of the determination to software 114 being executed on the processor unit 202. For example, the software 114 may be configured as an application, operating system, and the like, that uses the result of the determination to choose which operation of a selection of operations to perform. For instance, the software 114 may choose an operation based on availability of data in the cache memory 104 that will be used when the operation is performed.

Figure 8:
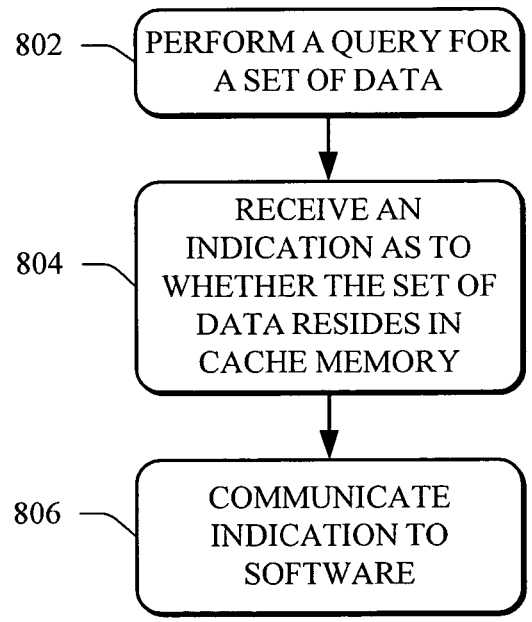
FIG. 8 is a flow diagram depicting an exemplary procedure in which determination of whether a set of data resides in a cache memory is performed by querying the cache memory and receiving an indication, the indication being provided to software executed on the processor unit.

FIG. 8 is a flow diagram illustrating an exemplary procedure 800 in which a determination of whether the set of data resides in a cache memory 104, as discussed in relation to block 704 of the previous exemplary procedure 700, is made by querying whether a set of data resides in the cache memory 104 and receiving an indication. At block 802, a query is performed for whether the set of data resides in the cache memory 104. Querying may include supplying an address of the set of data to the comparison unit 216 from the processor unit 202.

At block 804, the processor unit 202 receives an indication from the querying of whether the set of data resides in the cache memory 104. The indication may be configured in a variety of ways. For example, the indication may specify a binary condition of whether the set of data resides or does not reside in the cache memory 104. At block 806, the processor unit 202 communicates the indication to software 114 being executed on the processor unit 202.

Figure 9:
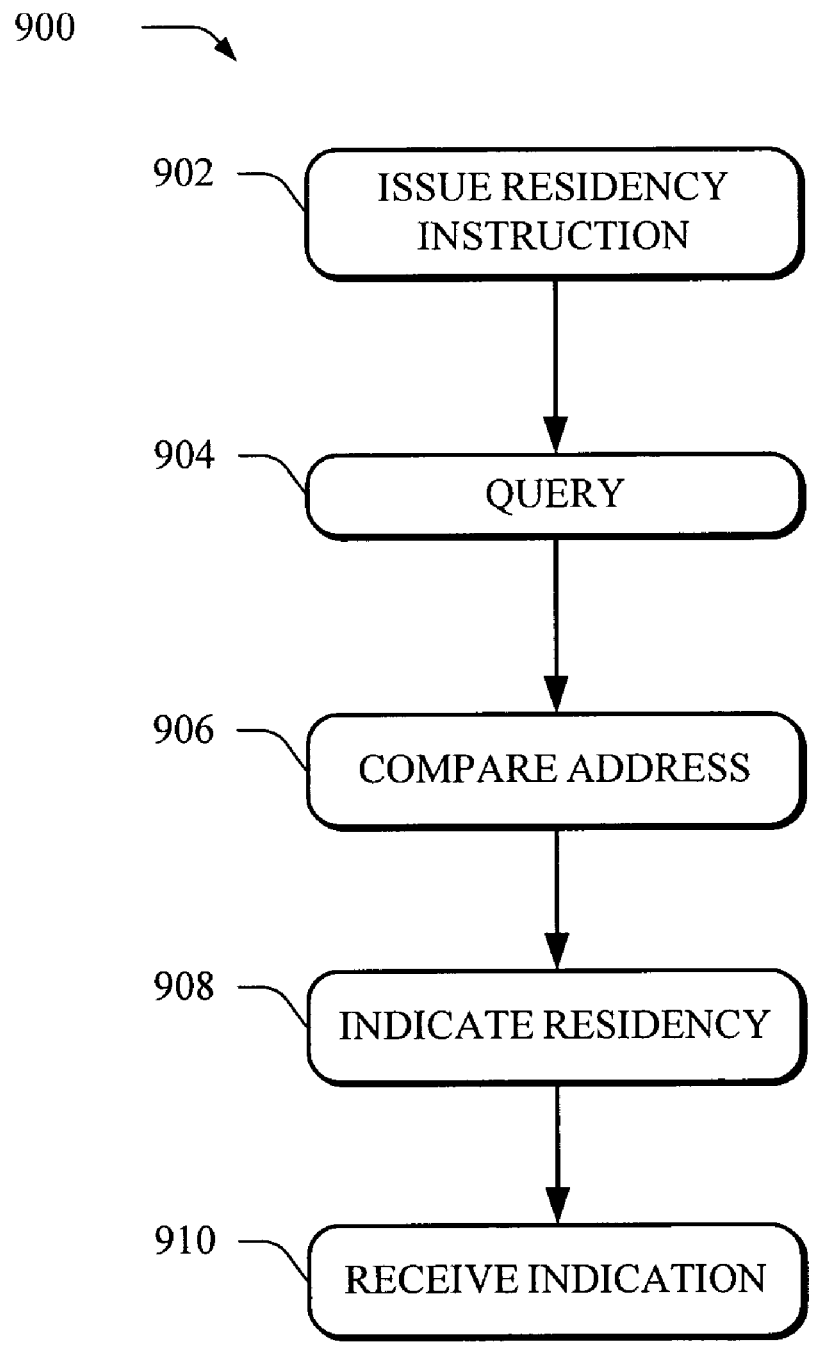
FIG. 9 is a flow diagram depicting an exemplary procedure in which a system including a processor unit, comparison unit, and a cache memory executes a residency instruction to determine if a set of data resides in the cache memory.

FIG. 9 is a flow diagram depicting an exemplary procedure 900 wherein a system, including a processor unit, comparison unit, and a cache memory, utilizes an execution of a residency instruction in order to determine if a set of data resides in the cache memory. At block 902, a processor unit issues a residency instruction. The issued residency instruction, when executed, configures the processor unit 202 to query whether a set of data resides in the cache memory 104 at block 904. For example, the processor unit 202 may supply an address of the set of data to a comparison unit 216. The comparison unit 216 may be configured as a memory management unit, a load/store unit, a cache controller, and the like.

At block 906, the comparison unit 216 compares the address received from the processor unit 202 with addresses included in the cache memory 104 in response to the query performed by the processor unit 202. Comparing the addresses may include translating the address received from the processor unit 202 so that the address corresponds to an address format of the cache memory 104. For example, a virtual address may be translated to a physical address, an address may be translated to correspond to a cache tag, and the like.

At block 908, the comparison unit 216 provides an indication to the processor unit 202 of whether the address of the set of data is included in the cache memory 104. By providing the indication of whether the address is included in the cache memory 104, the comparison unit indicates whether the set of data having that address is included in the cache memory 104. At block 910, the processor unit 202 receives the indication, which may indicate to the processor unit 202 characteristics which are likely to be encountered when interacting with the set of data. For instance, the indication indicates to the processor unit 202 that the set of data resided in the cache memory 104 when the cache memory 104 was queried. The cache memory 104, however, may have performed operations that have removed the set of data after the cache memory 104 was queried. For example, the cache controller, when determining which sets of data are included in the cache memory 104, may remove the set of data from the cache memory 104. Therefore, the indication may serve to indicate that the set of data is likely to reside in the cache memory 104. In other words, the indication indicates presence of the data in the cache hierarchy at the one or more moments the cache hierarchy was examined.

To increase the likelihood that the set of data still resides in the cache memory 104 for interaction with the processor unit 202, execution of the residency instruction 110 may signal to the cache controller to retain the set of data in the cache memory 104. For example, a cache controller may populate the cache memory 104 with sets of data based on how recently each set of data was accessed by the processor unit 202. The execution of the residency instruction may be used as a signal that the processor unit 202 may wish to access the set of data. Therefore, the cache controller may consider the execution of the residency instruction as accessing the set of data. As a result of this consideration, the cache controller could then retain the set of data based on recent access to set of data. In this way, the execution of the residency instruction 102 could increase the likelihood that the set of data resides in the cache memory 104 for access by the processor unit 202.

Figure 10:
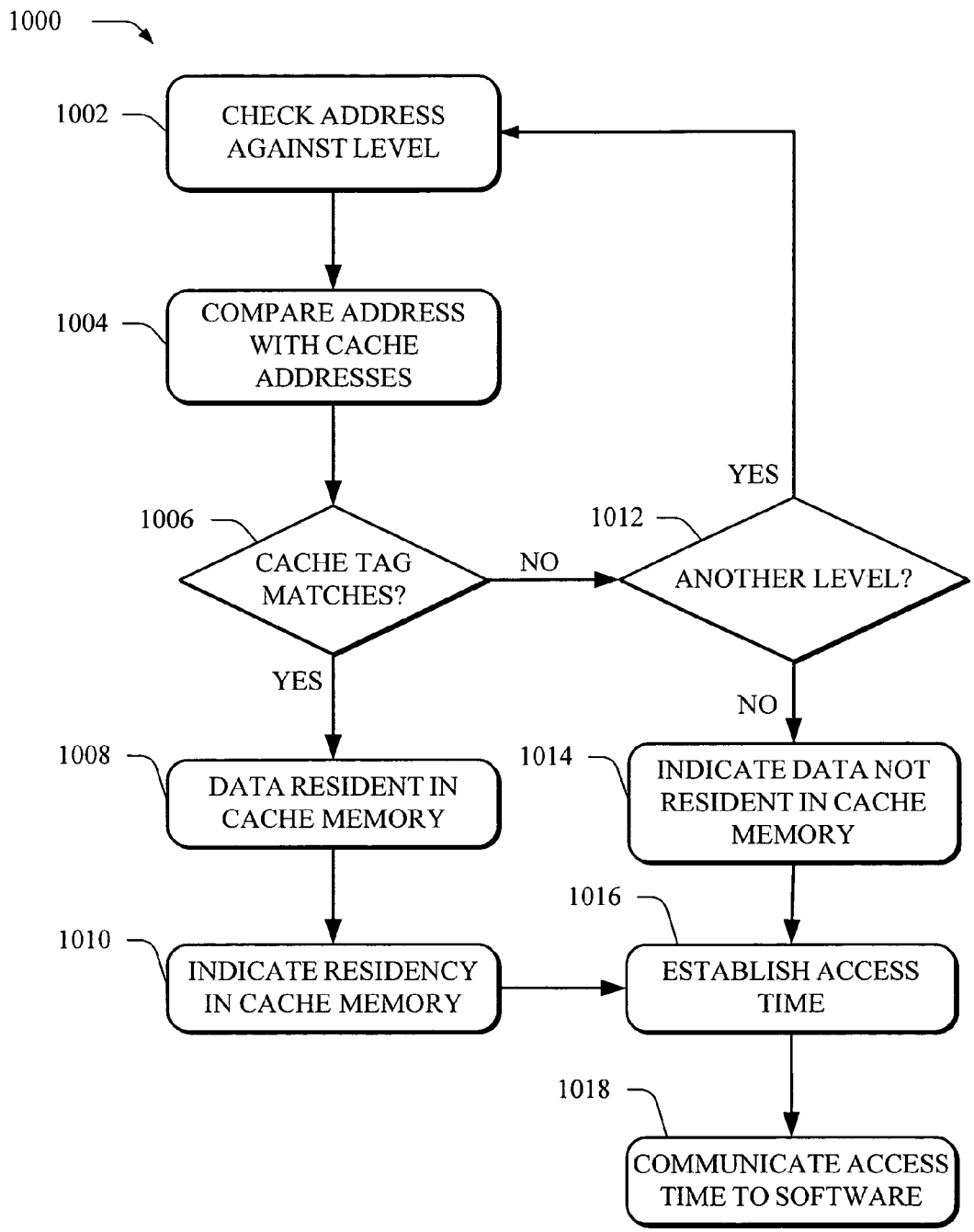
FIG. 10 is a flow diagram depicting an exemplary procedure in which an indication is provided to the processor unit which indicates at which level of the cache memory a set of data resides.

FIG. 10 is a flow diagram illustrating an exemplary procedure 1000 in which an indication is provided to the processor unit 202 which indicates that a set of data resides at a particular level of the cache memory 104. The cache memory 104 may include a plurality of levels 502-508 (FIG. 5), each of which may have different characteristics. For example, each successively higher level of the cache memory, i.e. higher in number, may be able to store a greater amount of data than a previous level of the cache memory, but may take a greater amount of time to provide access to that data. The residency instruction 102 may be executed to provide an indication to the processor unit 202 at which of the levels 502-508 of the cache memory 104, if any, the set of data resides. In this way, the processor unit 202 may recognize different characteristics that may be encountered when accessing data from the cache memory 104.

At block 1002, a level of the cache memory 104 is checked to determine whether a set of data resides at that level of the cache memory 104. To check the level of the cache memory 104, at block 1004, an address received by the comparison unit 216 from the processor unit 202 may be compared with addresses at that level of the cache memory 104. At block 1006, if an address of the cache memory 104 corresponds to the received address, then at block 1008, the set of data resides at that level of the cache memory. Therefore, at block 1010, the comparison unit 216 indicates that the set of data resides in that level of the cache memory 104 to the processor unit 202 by providing an indication.

If at block 1006, however, the addresses of the cache memory 104 do not correspond to the address received from the processor unit 202, at block 1012, the comparison unit 216 determines if there is another level of the cache memory 104. If there is another level, the procedure 1000 returns to block 1002. If the cache memory 104 does not include another level, at block 1014, the comparison unit 216 indicates to the processor unit 202, through use of an indication, that the set of data does not reside in the cache memory 104.

At block 1016, a relative amount of time is established to access the set of data based on the determination. For example, the indication may indicate that the set of data resides in the cache memory 104. Therefore, as seen in FIG. 2, the processor unit 202 may establish that the set of data may be accessed in a shorter amount of time than accessing the set of data if it resided in other portions of the memory 108. At block 1018, the access time is communicated to software being executed on the processor unit 202.

In another implementation, the indication may indicate that the set of data resides in a particular level of the cache memory. Therefore, the processor unit 202 may establish a relative amount of time to access the set of data located at that particular level of the cache memory. For instance, the processor unit 202 may be provided with a look-up table which indicates a relative amount of time which will be used to access data contained in each level of the cache memory 104. The processor unit 202 may determine that the set of data resides at a particular level of the cache memory 104, and use the look-up table to determine the amount of time (e.g. seconds, a number of clock cycles, etc.) to access data included in that particular level of the cache memory. A variety of other ways of establishing a relative amount of time may also be utilized. Although consecutive querying of caches has been described, in additional embodiments some or all of the caches may be queried concurrently.

EXEMPLARY OPERATING ENVIRONMENT

Figure 11:
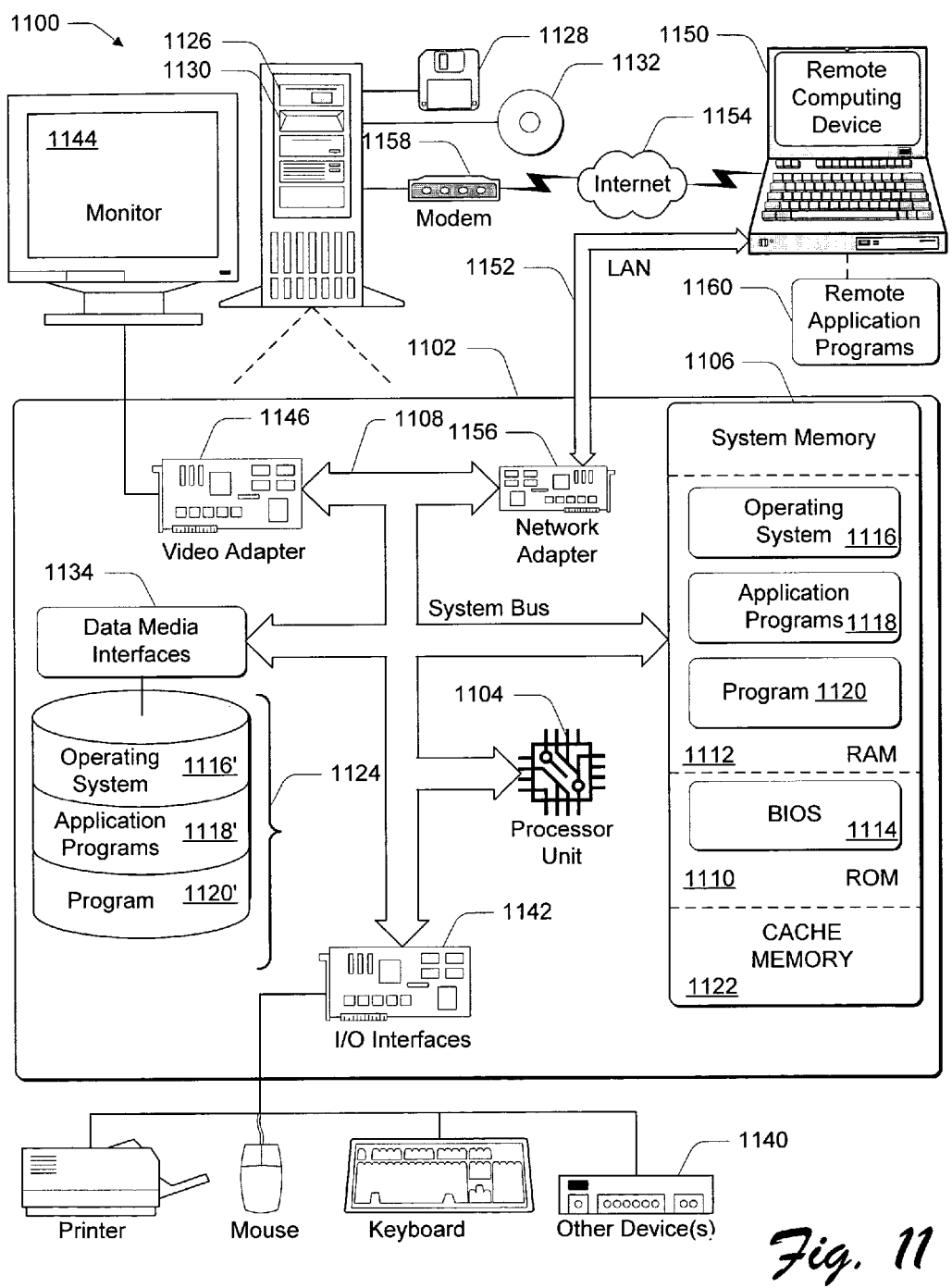
FIG. 11 is a diagram of an exemplary operating environment.

The various components and functionality described herein are implemented with a number of individual computers. FIG. 11 shows components of a typical example of a computer environment 1100, including a computer, referred by to reference numeral 1102. The components shown in FIG. 11 are only examples, and are not intended to suggest any limitation as to the scope of the functionality of the invention; the invention is not necessarily dependent on the features shown in FIG. 11.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the processor(s) of the computer.

With reference to FIG. 11, the components of computer 1102 may include, but are not limited to, a processor unit 1104, a system memory 1106, and a system bus 1108 that couples various system components including the system memory to the processor unit 1104. The system bus 1108 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

The processor unit 1104 may be configured in a variety of ways. For example, the processor unit 1104 may be included on a processor chip 106 as shown in FIG. 2. The cache memory 104 may also be included with on the processor chip 106. In another configuration, the processor unit 202 and the cache memory 104 are located on physically separate, but communicatively coupled, chips. Additionally, as shown in FIG. 6, multiple processor units 602, 604 may be employed by the computer 1102.

Computer 1102 typically includes a variety of computer-readable media. Computer-readable media can be any available media that can be accessed by computer 1102 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1102. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 1106 includes computer storage media in the form of volatile and/or nonvolatile memory such as read only memory (ROM) 1110 and random access memory (RAM) 1112. A basic input/output system 1114 (BIOS), containing the basic routines that help to transfer information between elements within computer 1102, such as during start-up, is typically stored in ROM 1110. RAM 1112 typically contains data and/or program modules that are accessible to and/or presently being operated on by processor unit 1104. By way of example, and not limitation, FIG. 11 illustrates examples of software 114 (FIG. 1) including an operating system 1116, application programs 1118, other program modules and program data 1120.

The system memory 1106 also includes cache memory 1122. The cache memory 1122 may be accessible to the processor unit 1104 over the system bus 1108. For example, the cache memory 112 may be included on a processor card or motherboard. In another implementation, the cache memory 112 and the processor unit 1104 are included on a processor chip 106 as shown in FIG. 2.

The computer 1102 may also include other peripheral memories 112 as described in relation to FIG. 1, such as removable/non-removable and volatile/nonvolatile computer storage media. By way of example only, FIG. 11 illustrates a hard disk drive 1124 that reads from or writes to non-removable, nonvolatile magnetic media, a magnetic disk drive 1126 that reads from or writes to a removable, nonvolatile magnetic disk 1128, and an optical disk drive 1130 that reads from or writes to a removable, nonvolatile optical disk 1132 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1124 is typically connected to the system bus 1108 through a non-removable memory interface such as data media interface 1134, and magnetic disk drive 1126 and optical disk drive 1130 are typically connected to the system bus 1108 by a removable memory interface.

The drives and their associated computer storage media discussed above and illustrated in FIG. 11 provide storage of software 114 (FIG. 1) including computer-readable instructions, data structures, program modules, and other data for computer 1102. For example, the residency instruction 102 may be stored in the memories for execution by the processor unit 1104 when desired. In FIG. 11, for example, hard disk drive 1124 is illustrated as storing operating system 1116', application programs 1118', other program modules 1120', and program data 1122'. Note that these components can either be the same as or different from operating system 1116, application programs 1118, other program modules 1120, and program data 1122. Operating system 1116', application programs 1118', other program 1120' modules and data are given different numbers here to illustrate that, at a minimum, they are different copies. A user may enter commands and information into the computer 1102 through input devices such as a keyboard 1136 and pointing device 1138, commonly referred to as a mouse, trackball, or touch pad. Other input devices (not shown) may include a microphone, joystick, game pad, satellite dish, scanner, or the like. These and other input devices 1140 are often connected to the processor unit 1104 through an input/output (I/O) interface 1142 that is coupled to the system bus, but may be connected by other interface and bus structures, such as a parallel port, game port, or a universal serial bus (USB). A monitor 1144 or other type of display device is also connected to the system bus 1108 via an interface, such as a video adapter 1146. In addition to the monitor 1144, computers may also include other peripheral output devices (e.g., speakers) and one or more printers 1148, which may be connected through the I/O interface 1142.

The computer may operate in a networked environment using logical connections to one or more remote computers, such as a remote computing device 1150. The remote computing device 1150 may be a personal computer, a server, a router, a network PC, a peer device or other common network node, and typically includes many or all of the elements described above relative to computer 1102. The logical connections depicted in FIG. 11 include a local area network (LAN) 1152 and a wide area network (WAN) 1154. Although the WAN 1154 shown in FIG. 11 is the Internet, the WAN 1154 may also include other networks. Such networking environments are commonplace in offices, enterprise-wide computer networks, intranets, and the like.

When used in a LAN networking environment, the computer 1102 is connected to the LAN 1152 through a network interface or adapter 1156. When used in a WAN networking environment, the computer 1102 typically includes a modem 1158 or other means for establishing communications over the Internet 1154. The modem 1158, which may be internal or external, may be connected to the system bus 1108 via the I/O interface 1142, or other appropriate mechanism. In a networked environment, program modules depicted relative to the computer 1102, or portions thereof, may be stored in the remote computing device 1150. By way of example, and not limitation, FIG. 11 illustrates remote application programs 1160 as residing on remote computing device 1150. It will be appreciated that the network connections shown are exemplary and other means of establishing a communications link between the computers may be used.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   querying whether a set of data resides in a cache memory that is communicatively coupled to a processor unit by comparing an address of the set data with at least one other address in the cache memory, wherein the cache memory includes a plurality of levels; and
   receiving an indication at the processor unit from the querying which indicates whether the set of data resides in the cache memory wherein if the address is included in the cache memory, the indication indicates at which level of the plurality of levels the address is included; and
   communicating the indication to an operating system being executed on the processor unit.

2. A method as described in claim 1, further comprising establishing a relative amount of time to access the set of data by the processor unit based on the indication which indicates whether the set of data resides in the cache memory.

3. A method as described in claim 1, wherein the set of data is selected from the group consisting of:
   an instruction for controlling the processor unit; and
   data for being processed by the processor unit.

4. A method as described in claim 1, wherein the cache memory is selected from the group consisting of:
   a cache memory for storing an instruction for controlling the processor unit;
   a cache memory for storing data for being processed by the processor unit; and
   a combination of the forgoing.

5. A method as described in claim 1, wherein the querying and the receiving are performed without reading the set of data from the cache memory to the processor unit and without writing the set of data from the processor unit to the cache memory.

6. One or more computer-readable media comprising computer-executable instructions that, when executed, perform the method as recited in claim 1.

7. A method comprising:
   comparing an address of a set data with at least one other address in a cache memory, wherein the cache memory includes a plurality of levels and is communicatively coupled to a processor unit;
   providing an indication to the processor unit, based on the comparing whether the address of the set of data is included in the cache memory, wherein if the address is included in the cache memory, the indication indicates at which level of the plurality of levels the address is included;
   establishing a relative amount of time to access the set of data, by the processor unit, based on which level of the plurality of levels the address is included; and
   communicating the indication, by the processor unit, to software being executed on the processor unit.

8. A method as described in claim 7, wherein the software is selected from the group consisting of an operating system and an application.

9. A method as described in claim 7, wherein the cache memory is selected from the group consisting of:
   a cache memory for storing an instruction for controlling the processor unit;
   a cache memory for storing data for being processed by the processor unit; and
   a combination of the forgoing.

10. One or more computer-readable media comprising computer-executable instructions that, when executed, perform the method as recited in claim 7.

11. For use on a processor unit that is communicatively coupled to a comparison unit that is communicatively coupled to a cache memory, a cache residency test instruction, which when executed on the processor unit, configures the comparison unit to perform acts comprising:
comparing an address received from the processor unit with an address in the cache memory;
providing an indication to the processor unit based on the comparing of whether the address is included in the cache memory, wherein the indication indicates to the processor unit whether the address is included in the cache memory, and if so, at which level of a plurality of levels of the cache memory the address is included; and
communicating the indication to an operating system being executed by the processor unit.

12. A cache residency test instruction as described in claim 11, wherein the cache memory is selected from the group consisting of:
a cache memory for storing an instruction for controlling the processor unit;
a cache memory for storing data for being processed by the processor unit; and
a combination of the forgoing.

13. A system comprising:
a cache memory that includes a plurality of levels; and
a processor unit communicatively coupled to the cache memory, wherein the processor unit includes a cache residency test instruction that, when executed, configures the processor unit:
to query whether a set of data resides in the cache memory;
to receive an indication from the query of whether the set of data resides in the cache memory, wherein if the set of data is included in the cache memory, the indication indicates at which level of the plurality of levels the set of data is included;
to establish a relative amount of time to access the set of data; and to communicate the indication and the relative amount of time to software being executed on the processor unit.

14. A system as described in claim 13, further comprising a comparison unit, wherein execution of the cache residency test instruction by the processor unit configures the comparison unit to compare an address of the set of data with at least one other address of the cache memory in response to the query.

15. A system as described in claim 13, wherein the set of data is selected from the group consisting of:
an instruction for controlling the processor unit; and
data for being processed by the processor unit.

16. A system as described in claim 13, wherein the cache memory is selected from the group consisting of:
a cache memory for storing an instruction for controlling the processor unit;
a cache memory for storing data for being processed by the processor unit; and
a combination of the forgoing.

17. A processor chip comprising
a processor unit having a coupling for communicatively coupling the processor unit to a cache memory having a plurality of levels, wherein:
the processor unit includes, storage for a cache residency test instruction; and
an execution of the cache residency test instruction with the processor unit configures the processor unit to determine if a set of data resides in the cache memory, and if so, establish which of the plurality of levels the set of data resides, establish a relative amount of time to access the set of data, and communicate a result of the determination and the relative amount of time to software being executed on the processor unit.

18. A processor chip as described in claim 17, further comprising a second processor unit having:
a coupling for communicatively coupled the second processor unit to the cache memory;
storage for a second cache residency test instruction; and
an execution of the second cache residency test instruction with the second processor unit configures the second processor unit to determine if a set of data resides in the cache memory and communicate a result of the determination to software being executed on the second processor unit.

19. A processor chip as described in claim 17, wherein the set of data is selected from the group consisting of:
an instruction for controlling the processor unit; and
data for being processed by the processor unit.

20. A processor chip as described in claim 17, wherein the cache memory is selected from the group consisting of:
a cache memory for storing an instruction for controlling the processor unit;
a cache memory for storing data for being processed by the processor unit; and
a combination of the forgoing.

21. A processor chip as described in claim 17, wherein the cache memory is selected from the group consisting of:
a cache memory located on the processor chip;
a cache memory located off the processor chip; and
a combination of the forgoing.

22. A processor chip as described in claim 17, wherein the cache memory is configured as a semiconductor-based memory.

23. A processor chip as described in claim 17, wherein the software is selected from the group consisting of an operating system and an application.

24. A computing device comprising:
a storage device; and
a processor chip, communicatively coupled to the storage device, and including:
a cache memory having a plurality of levels; and
a processor unit communicatively coupled to the cache memory, wherein the processor unit includes storage for a cache residency test instruction that, when executed by the processor unit, configures the processor unit to determine if a set of data resides in the cache memory, and if so, which of the plurality of levels of the cache memory the set of data resides, and to communicate a result of the determination to an operating system being executed on the processor chip.

25. A computing device as described in claim 24, wherein the processor chip further comprises a second processor unit communicatively coupled to the cache memory, wherein the second processor unit includes storage for a second cache residency test instruction that, when executed by the second processor unit, configures the second processor unit to determine if a set of data resides in the cache memory and to communicate a result of the determination to the operating system being executed on the processor chip.

26. A computing device as described in claim 24, wherein the set of data is selected from the group consisting of:
 an instruction for controlling the processor unit; and
 data for being processed by the processor unit.

27. A computing device as described in claim 24, wherein the cache memory is selected from the group consisting of:
 a cache memory for storing an instruction for controlling the processor unit;
 a cache memory for storing data for being processed by the processor unit; and
 a combination of the forgoing.

28. A computing device as described in claim 24, wherein the cache memory is configured as a semiconductor-based memory.

* * * * *